US006862892B1

(12) United States Patent
Meyer et al.

(10) Patent No.: US 6,862,892 B1
(45) Date of Patent: Mar. 8, 2005

(54) HEAT PUMP AND AIR CONDITIONING SYSTEM FOR A VEHICLE

(75) Inventors: John J. Meyer, Northville, MI (US); Chao A. Zhang, Canton, MI (US); Zhaoli G. Yang, Canton, MI (US); Evangelos Papoulis, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 4 days.

(21) Appl. No.: 10/643,796

(22) Filed: Aug. 19, 2003

(51) Int. Cl.[7] .............................................. F25B 1/00
(52) U.S. Cl. ......................... 62/115; 62/244; 62/238.7; 62/435; 165/42; 165/43
(58) Field of Search ............................ 62/244, 238.6, 62/238.7, 434, 435, 199, 200, 115; 165/42, 43, 202, 240; 237/2 B, 12.3 B

(56) References Cited

U.S. PATENT DOCUMENTS

| | | | |
|---|---|---|---|
| 3,753,462 A | * | 8/1973 | Burger ........................ 165/204 |
| 4,616,484 A | | 10/1986 | Mehdi et al. |
| 4,728,397 A | * | 3/1988 | Kjellander et al. .......... 202/180 |
| 4,779,425 A | * | 10/1988 | Sasaki et al. .................. 62/199 |
| 4,949,553 A | | 8/1990 | Suzuki |
| 5,211,023 A | | 5/1993 | Matsuura |
| 5,425,250 A | | 6/1995 | Hutchison et al. |
| 5,497,941 A | | 3/1996 | Numazawa et al. |
| 5,549,153 A | | 8/1996 | Baruschke et al. |
| 5,598,887 A | | 2/1997 | Ikeda et al. |
| 5,641,016 A | * | 6/1997 | Isaji et al. ..................... 165/43 |
| 5,678,761 A | | 10/1997 | Ikeda |
| 5,730,216 A | * | 3/1998 | Viegas et al. ............... 165/233 |
| 5,899,086 A | | 5/1999 | Noda et al. |

(Continued)

FOREIGN PATENT DOCUMENTS

JP        357004415 A  *  1/1982

(Continued)

Primary Examiner—William E. Tapolcai
Assistant Examiner—Mohammad M. Ali
(74) Attorney, Agent, or Firm—MacMillan, Sobanski & Todd, LLC

(57) ABSTRACT

A heat pump and air conditioning system for a vehicle that has at least one coolant loop selectively connecting an engine cooling system with a heater core, a first coolant/refrigerant heat exchanger, and/or a second coolant/refrigerant heat exchanger, in order to warm a passenger compartment of the vehicle. The system also includes a refrigerant loop that includes a first expansion device between a condenser and evaporator, and a second expansion device between the first coolant/refrigerant heat exchanger and the second coolant/refrigerant heat exchanger. The refrigerant loop provides for cooling of the passenger compartment of the vehicle, as well as operating as a heat pump, together with the at least one coolant loop, to provide heat to the vehicle passenger compartment.

25 Claims, 7 Drawing Sheets

U.S. PATENT DOCUMENTS

| | | | |
|---|---|---|---|
| 5,904,052 A | 5/1999 | Inoue et al. | |
| 5,910,157 A | 6/1999 | Noda | |
| 5,996,362 A * | 12/1999 | Likitcheva | 62/174 |
| 6,038,877 A * | 3/2000 | Peiffer et al. | 62/244 |
| 6,047,770 A | 4/2000 | Suzuki et al. | |
| 6,092,383 A | 7/2000 | Mertens | |
| 6,230,505 B1 | 5/2001 | Noda et al. | |
| 6,233,957 B1 | 5/2001 | Hirao et al. | |
| 6,276,153 B1 | 8/2001 | Skupin et al. | |
| 6,293,114 B1 | 9/2001 | Kamemoto | |
| 6,422,308 B1 | 7/2002 | Okawara et al. | |
| 6,457,324 B2 * | 10/2002 | Zeigler et al. | 62/406 |
| 6,640,889 B1 * | 11/2003 | Harte et al. | 165/202 |
| 6,679,320 B2 * | 1/2004 | Stefan | 165/202 |
| 6,715,307 B2 * | 4/2004 | Hatakeyama et al. | 62/244 |
| 2001/0052238 A1 | 12/2001 | Burk et al. | |
| 2002/0066278 A1 * | 6/2002 | Cho et al. | 62/114 |
| 2003/0164001 A1 * | 9/2003 | Vouzelaud et al. | 62/244 |

FOREIGN PATENT DOCUMENTS

| | | |
|---|---|---|
| JP | 61-94811 | 5/1986 |
| JP | 62-26110 | 4/1987 |
| JP | 4-243619 | 8/1992 |
| JP | 10-44758 | 2/1998 |
| JP | 10-278561 | 10/1998 |
| JP | 2000-301935 | 10/2000 |
| JP | 2003118355 A * | 4/2003 |

* cited by examiner

HEAT PUMP AND AIR CONDITIONING SYSTEM FOR A VEHICLE

BACKGROUND OF INVENTION

The present invention relates to heating, ventilation and air conditioning (HVAC) systems for vehicles, and in particular to such systems having dual modes for providing heat to passenger compartments of the vehicles.

In a conventional automotive vehicle employing an internal combustion engine, the heating of the passenger compartment is accomplished by running engine coolant, typically a mix of water and glycol (antifreeze), through a heater core in the passenger compartment, and then blowing air over the heater core and onto the passengers. The drawback with this is that the heater core will not provide heat until the engine has caused the coolant to warm up. For most conventional engines, this time to warm up the coolant is sufficiently short to satisfy the vehicle passengers.

Now, however, newer engines and powertrain arrangements are being developed where the engine does not produce as much excess heat for the coolant to absorb. Some examples are a direct injection engine and a hybrid (engine/motor) powertrain. For these types of powertrains, the temperature of the coolant can take a very long time to rise to a level where it will allow for adequate heating of the passenger compartment when using a conventional heating system.

Most automotive vehicles today also include an air conditioning system for cooling the air in the passenger compartment. The air conditioning system can begin to operate almost as soon as the vehicle is started. Some, then, have recognized that the components of the air conditioning system can be employed to operate in a heat pump mode, and so the conventional coolant based heating system is supplemented or replaced with heat from the heat pump operation. But these systems become less and less efficient for heating as the heat source temperature becomes colder.

Moreover, since these types of combination air conditioning/heat pump systems employ the air conditioning system evaporator as a condenser in heat pump mode, there can be a flash fogging concern that occurs when the system is switched from operating in the air conditioning mode to operating in the heat pump mode. That is, when operating in the air conditioning mode, water may condense on the evaporator. Then, when the system is switched to the heat pump mode, the evaporator now acts as a condenser, causing the water condensate to vaporize. Also, the air flowing in the heat pump mode is not dehumidified because it is heated rather than cooled before passing through the heater core. Blowing the humid air on the windshield can possibly cause fogging on a cold windshield, which is generally disliked by vehicle occupants.

Another limitation to the air conditioning/heat pump types of systems is that they need to be capable of performing this additional function—over and above a conventional vehicle HVAC system—while minimizing the additional cost of such a system. Thus minimizing the cost of additional components is desirable.

Thus, it is desirable to have a vehicle heating and cooling system that overcomes the drawbacks of conventional vehicle heating, as well as typical heat pump systems, in order to warm a vehicle passenger compartment more quickly, while minimizing the additional cost.

SUMMARY OF INVENTION

In its embodiments, the present invention contemplates a heating and cooling system for a vehicle having an engine and a passenger compartment. The heating and cooling system includes at least one coolant loop having a coolant outlet line and a coolant inlet line adapted to operatively engage the engine, a heater core, a first coolant/refrigerant heat exchanger, a second coolant/refrigerant heat exchanger, and at least one coolant valve for selectively directing flow of a coolant from the coolant outlet line to the coolant inlet line through at least one of the heater core, the first coolant/refrigerant heat exchanger, and the second coolant/refrigerant heat exchanger. A pump operatively engages the at least one coolant loop. Also, the heating and cooling system includes a refrigerant loop having a compressor with an inlet and an outlet, a first refrigerant valve for selectively directing the flow of a refrigerant from the compressor outlet to one of a condenser and the second coolant/refrigerant heat exchanger, a first refrigerant passage connected to the condenser for directing the flow of the refrigerant from the condenser, through a first expansion device and to an evaporator, and a second refrigerant line connected to the second coolant/refrigerant heat exchanger for directing the flow of the refrigerant from the second coolant/refrigerant heat exchanger, through a second expansion device and to the first coolant/refrigerant heat exchanger.

The present invention further contemplates a heating and cooling system for a vehicle having an engine and a passenger compartment. The heating and cooling system includes a first coolant loop having a coolant outlet line and a coolant inlet line adapted to couple to the engine, a heater core, a first coolant/refrigerant heat exchanger, and a first coolant valve and a second coolant valve for selectively directing flow of a coolant from the coolant outlet line to the coolant inlet line through one of the heater core and the first coolant/refrigerant heat exchanger. A second coolant loop has a second coolant/refrigerant heat exchanger with a coolant inlet line and a coolant outlet line which are selectively connected for coolant flow through the heater core by the first coolant valve and the second coolant valve. A pump operatively engages at least one of the first coolant loop and the second coolant loop. The heating and cooling system also includes a refrigerant loop having a compressor with an inlet and an outlet, a first refrigerant valve for selectively directing the flow of a refrigerant from the compressor outlet to one of a condenser and the second coolant/refrigerant heat exchanger, a first refrigerant passage connected to the condenser for directing the flow of the refrigerant from the condenser, through a first expansion device and to an evaporator, and a second refrigerant line connected to the second coolant/refrigerant heat exchanger for directing the flow of the refrigerant from the second coolant/refrigerant heat exchanger, through a second expansion device and to the first coolant/refrigerant heat exchanger.

The present invention also contemplates a method of providing heating and cooling to a passenger compartment of a vehicle having an engine, the method comprising the steps of: selectively circulating a coolant from the engine, through at least one of a heater core and a first coolant/refrigerant heat exchanger, and back to the engine; selectively circulating the coolant from a pump, through one of a second coolant/refrigerant heat exchanger and the heater core, through the other of the second coolant/refrigerant heat exchanger and the heater core, and back to the pump; and selectively circulating a refrigerant from a compressor and back to the compressor through one of a first refrigerant path, having a condenser and an evaporator, and a first expansion device between the condenser and the evaporator, and a second refrigerant path, having the second coolant/refrigerant heat exchanger, the first coolant/refrigerant heat exchanger, and a second expansion device between the second coolant/refrigerant heat exchanger and the first coolant/refrigerant heat exchanger.

An advantage of the present invention is that the vehicle heating and cooling system can operate in a conventional air conditioning mode, with cooling effectiveness essentially as good as with a conventional air conditioning system, and yet still operate in a heat pump mode to provide supplemental heating when the conventional heating system is not up to an effective operating temperature.

An additional advantage of the present invention is that a heat pump type of system operation can be combined with an essentially conventional air conditioning operation, without creating potential flash fogging issues.

Another advantage of the present invention is that, in the heat pump mode of operation, the coolant which flows through the heater core absorbs heat from the refrigerant in the heat pump system, which is more effective than absorbing heat from the ambient air.

A further advantage of the present invention is that the heating and cooling system can operate in all three modes, with the advantages noted above, while minimizing the additional cost of the system over a conventional HVAC system. That is, heat pump heat exchangers can be added in a loop that is generally in parallel with the conventional air conditioning heat exchangers, while minimizing the costs of the components and valving.

DETAILED DESCRIPTION

Figure 1:
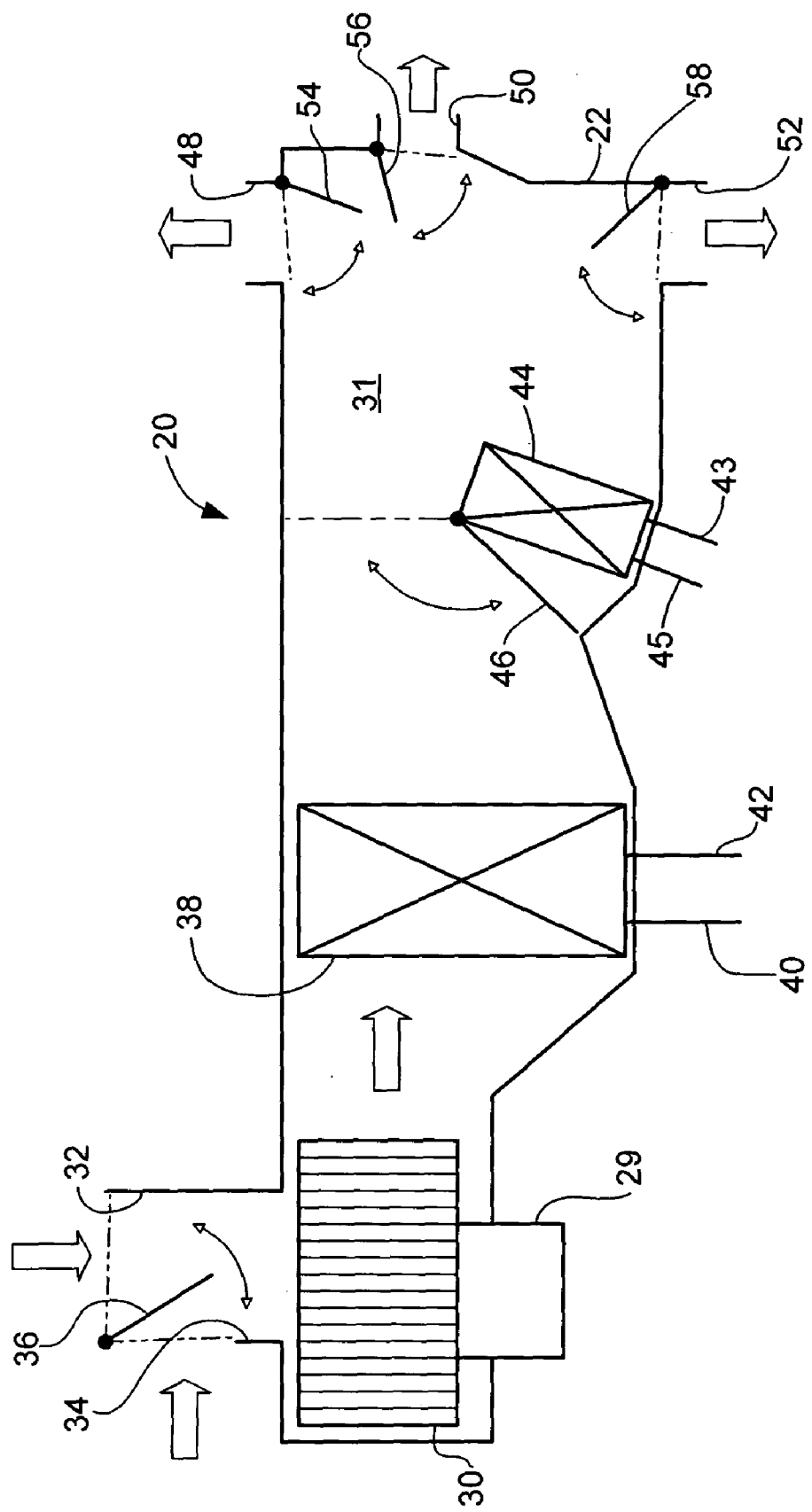
FIG. 1 is a schematic diagram of a portion of a heating and cooling system that is located in a passenger compartment of a vehicle, in accordance with the present invention.
Figure 2:
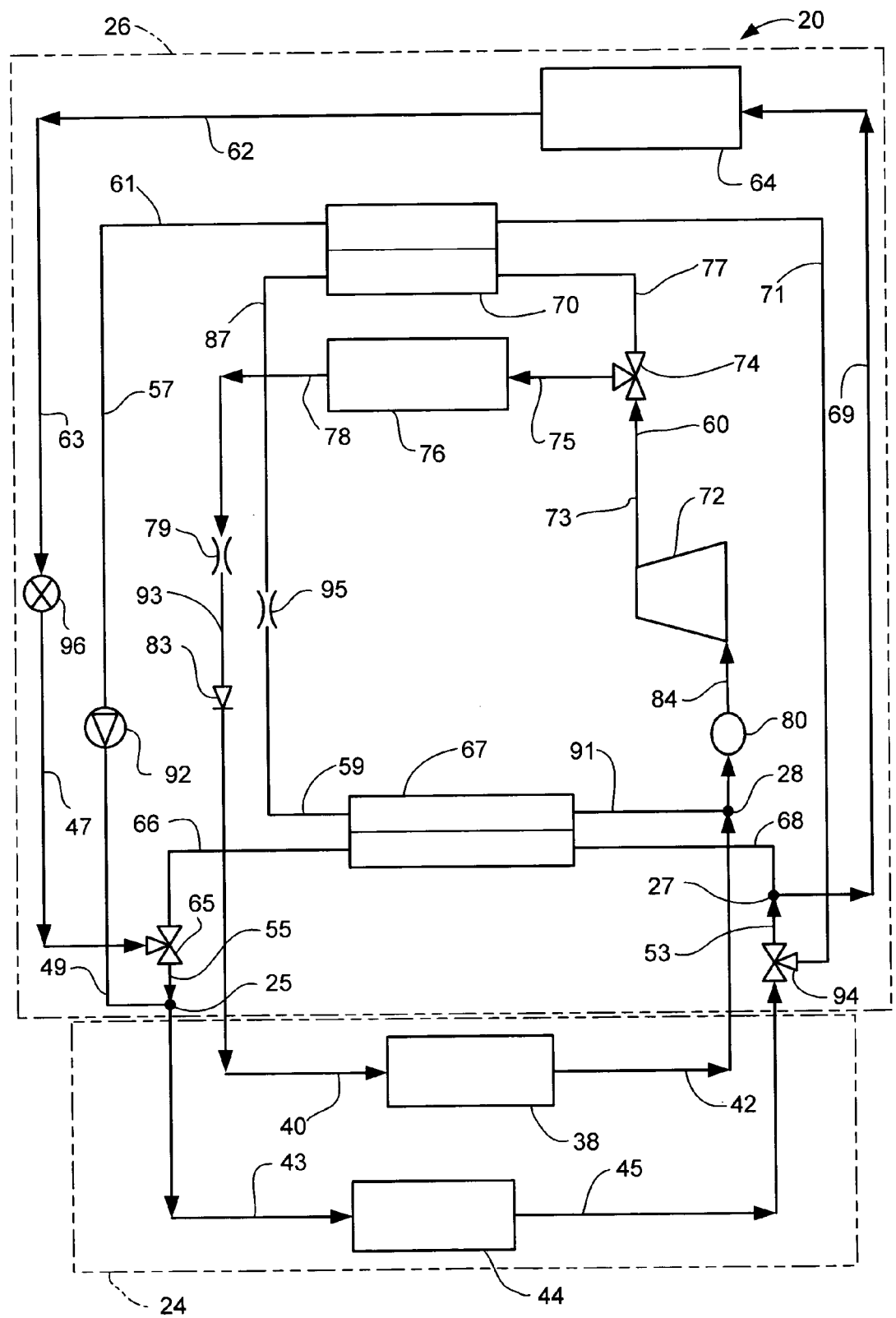
FIG. 2 is a schematic diagram of the vehicle heating and cooling system, illustrating the direction of fluid flow during a cooling cycle, in accordance with the present invention.
Figure 3:
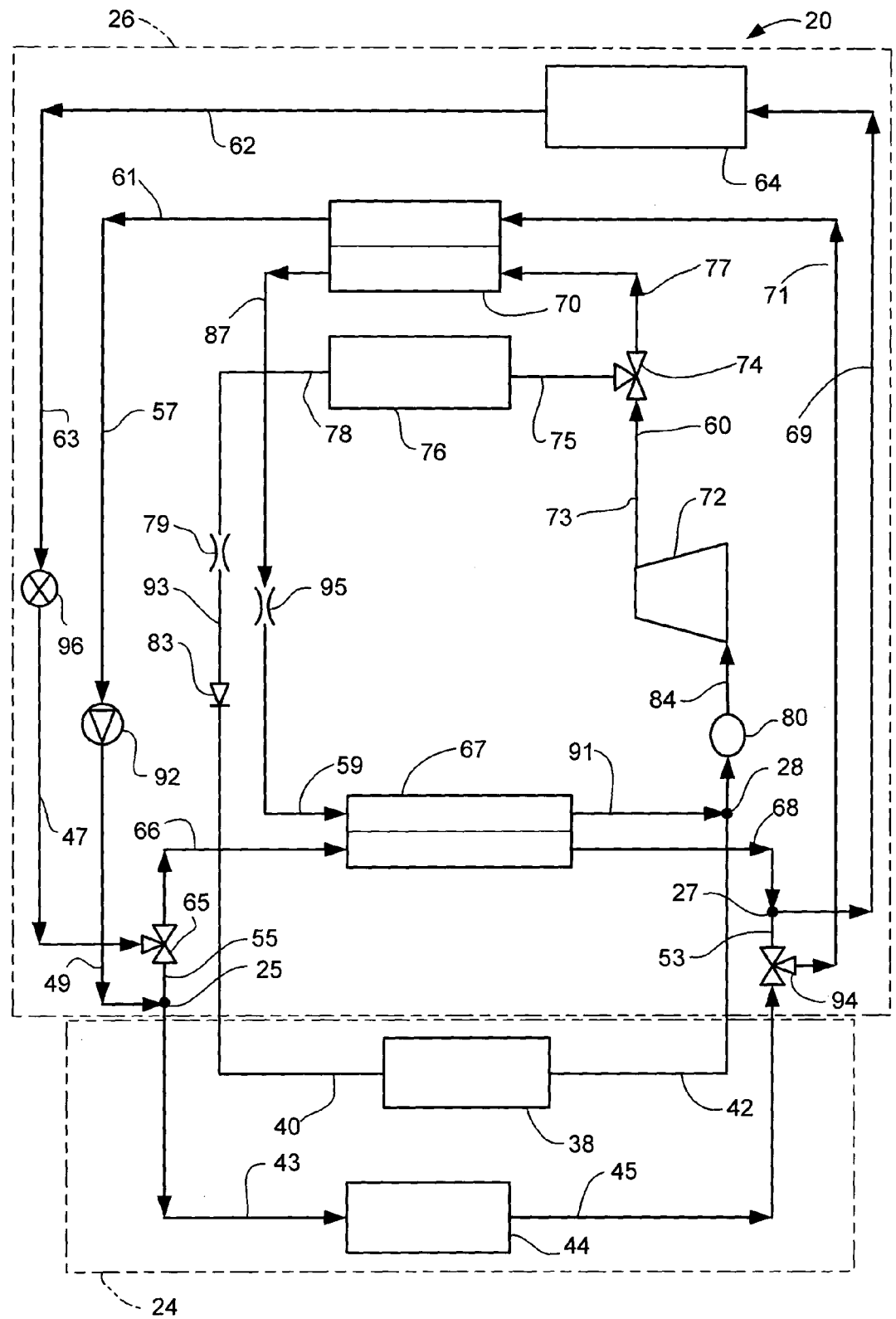
FIG. 3 is a schematic diagram similar to FIG. 2, but illustrating the direction of fluid flow during a heat pump cycle.

FIGS. 1-3 illustrate a vehicle heating and cooling system 20 that is partially located behind an instrument panel 22 in a vehicle passenger compartment 24, and partially in a vehicle engine compartment 26. The system 20 includes a blower 30, driven by a motor 29, and mounted in an air passage 31 in the passenger compartment 24. The blower 30 is located adjacent to an external air inlet 32, an internal air inlet 34, and an air mixing damper 36 that can be moved to partially or fully block off the external air inlet 32 or the internal air inlet 34 from the air passage 31.

Also located in the air passage 31, near the blower 30, is an evaporator 38. The evaporator 38 includes a pair of refrigerant lines 40 and 42 for directing refrigerant into and out of it. The refrigerant in the lines 40, 42 may be any type of refrigerant found in air conditioning or refrigeration systems, such as, for example, R134a. The evaporator 38 is an air/refrigerant heat exchanger.

A heater core 44 is located in the air passage 31, as well as a second air mixing damper 46, which can be moved to allow air flow through the heater core 44, block air flow from the heater core 44, or allow for a partial flow. An engine coolant intake line 43 and an engine coolant outlet line 45 connect to the heater core 44. The engine coolant in these lines 43, 45 may be any type of coolant found in engine cooling systems, such as, for example, a mixture of water and glycol. The heater core 44 is an air/coolant heat exchanger.

The air passage 31 also includes three air outlets 48, 50 and 52, with three corresponding dampers 54, 56 and 58 that can be adjusted to vary the flow through each of the air outlets 48, 50, 52. These air outlets may be, for example, an outlet 48 directed toward a vehicle windshield (not shown) for defrosting, an outlet 50 directed toward the bodies of vehicle occupants (not shown), and an outlet 52 directed toward the feet of vehicle occupants.

The heating and cooling system 20 includes three main fluid loops—there is a refrigerant loop 60, a first coolant loop 62, and a second coolant loop 61. The first coolant loop 62 includes an outlet line 63 extending between an engine 64 and a modulating coolant valve 96, and a coolant line 47 extending from the valve 96 to a first coolant three-way valve 65. The first coolant three-way valve 65 also connects to the coolant intake line 43 of the heater core 44, and to an intake line 66 to coolant passages in a first coolant/refrigerant heat exchanger 67. The coolant outlet line 45 from the heater core 44 connects to a second coolant three-way valve 94, which then connects to a coolant outlet line 68 from the heat exchanger 67. The coolant line 68 includes a first coolant tee 27, which connects to a coolant inlet line 69 running back to the engine 64, and a coolant line 53 connecting to the second coolant three-way valve 94. The coolant is preferably pumped through the first coolant loop 62 with a conventional water pump (not shown), which is part of a conventional engine cooling system (not shown) including a radiator, fan, etc.

The second coolant loop 61 includes a second coolant/refrigerant heat exchanger 70 that connects to a coolant line 57, which, in turn, connects to the inlet of a water pump 92. The outlet of the water pump 92 connects to a coolant line 49, which, in turn, connects to the coolant intake line 43 via a second coolant tee 25. The water pump 92 can be electrically or mechanically powered, but only needs to operate when the heating and cooling system 20 is in a heat pump mode, so an electronically driven pump 92 is preferred. The second coolant tee 25 also connects to the coolant three-way valve 65 via a coolant line 55. The second heat exchanger 70 also connects to a coolant line 71, the other end of which connects to the three way valve 94.

The refrigerant loop 60 includes a compressor 72. The compressor 72 may be any one of several different types (for example, piston, swash plate, scroll), it may be driven by the engine 64 or by a separate motor, and it may have a clutch to disconnect it from the engine or motor or it may be a variable capacity type, as may be desired depending upon the particular vehicle and engine. In any event, the compressor 72 will be a design that allows for operation under cold ambient air conditions since it will be operating in the heat pump mode as well as the air conditioning mode.

The compressor 72 connects to a compressor outlet line 73 which leads to a first refrigerant three-way valve 74. The three-way valve 74 also connects to a condenser inlet line 75 that leads to a condenser 76, and to a refrigerant line 77 that leads to refrigerant tubes in the second coolant/refrigerant heat exchanger 70. The second coolant/refrigerant heat exchanger 70 also connects to a refrigerant outlet line 87, which connects to a first orifice tube 95. The first orifice tube 95 is connected to the first coolant/refrigerant heat exchanger 67, via refrigerant line 59. The outlet of this heat exchanger 67 connects to refrigerant line 42, through refrigerant line 91 and a first refrigerant tee 28. The refrigerant line 42 also extends from the outlet of the evaporator 38 to an accumulator 80. The accumulator 80, in turn, connects to the inlet to the compressor 72 via refrigerant line 84.

The outlet of the condenser 76 connects to a second orifice tube 79 via a refrigerant line 78. The second orifice tube 79, in turn, connects to a check valve 83, via refrigerant line 93. The check valve 83 connects to the evaporator 38, via refrigerant line 40, and will allow refrigerant flow into the evaporator 38, via line 40, but will block flow in the opposite direction. In particular, it will prevent reverse flow of refrigerant through the evaporator 38 during the heat pump mode of operation. If so desired, the check valve 83 can be located in refrigerant line 42, prior to the tee 28, rather than being located upstream of the evaporator 38, as is illustrated in the alternate embodiments. This alternative location may allow for improved refrigerant draw at cold start, while still preventing reverse flow through the evaporator in a heat pump mode of operation.

The operation of the first embodiment, illustrated in FIGS. 1-3, will now be discussed. There are three different modes of operation for the heating and cooling system 20. The first mode is the cooling (air conditioning) mode. The flow of the refrigerant and the coolant for this mode is illustrated by the arrows on the refrigerant and coolant lines in FIG. 2.

The refrigerant is compressed by the compressor 72 and flows into the first refrigerant three-way valve 74, which directs it into the condenser 76 via condenser inlet line 75. The three-way valve 74 is closed to line 77. The action of the compressor 72 in compressing the refrigerant causes the refrigerant temperature to rise. Ambient air flowing through the condenser 76 will absorb heat from the refrigerant. The refrigerant then flows through the condenser outlet line 78 into the second orifice tube 79. The second orifice tube 79 will regulate the pressure of the refrigerant, and thus, the temperature of the refrigerant leaving the orifice tube 79. This refrigerant will pass through line 93, the second check valve 83, through the refrigerant line 40 and into the evaporator 38. The blower 30 forces air across the evaporator 38, which will absorb heat from the air before the air flows into the passenger compartment 24. The refrigerant will flow out of the evaporator 38, via refrigerant line 42, through the accumulator 80, and back to the compressor 72. So, in the cooling mode, the system 20 operates very similar to a conventional vehicle air conditioning system.

In the first mode of operation, the engine coolant in the first coolant loop 62 flows from the engine 64, through the outlet line 63, the modulating coolant valve 96, coolant line 47, through the first coolant three-way valve 65, coolant intake line 43 and into the heater core 44. The first coolant three-way valve 65 is closed to line 66. While the blower 30 will create air flow within the air passage 31, the damper 46 is generally closed and so the air entering the passenger compartment 24 will not pass over the heater core 44. Thus, the coolant will have only a vary negligible effect on the temperature of the air flowing into the passenger compartment 24. To further reduce any possible heating effect, the modulating valve 96 can be closed to prevent any coolant flow through the heater core 44. Alternatively, if one desires a blending of some heat with the cooling effect of the evaporator 38, one may partially or fully open the damper 46, and control the flow rate of the coolant through the first coolant loop 62 by adjusting the amount of valve opening in the modulating coolant valve 96.

From the heater core 44, then, the coolant flows through coolant outlet line 45, through the second coolant three-way valve 94, through a portion of coolant line 68, through coolant engine inlet line 69, and back to the engine 64. The coolant flow within the engine 64 and radiator (not shown) will not be discussed since it is conventional. For this mode of operation, the water pump 92 is preferably off, and so no coolant will flow through the second coolant loop 61.

The second mode of operation is the heat pump mode. The direction of flow of refrigerant and coolant for this mode is illustrated in FIG. 3. This mode is employed when the coolant is still cool, but the passenger compartment 24 needs to be warmed. In this mode, the refrigerant flows through the compressor 72, where it is compressed, and to the refrigerant three-way valve 74 via compressor outlet line 73. The three-way valve 74 directs the refrigerant into refrigerant line 77, and blocks the flow into condenser inlet line 75. The compressed refrigerant then flows into the second coolant/refrigerant heat exchanger 70. The refrigerant, being at a higher temperature than the coolant in the second coolant loop 61, will transfer heat to the coolant. The second coolant/refrigerant heat exchanger 70, in effect, acts as a condenser. The refrigerant then flows through refrigerant line 87, the first orifice tube 95, and the refrigerant line 59 before it enters into the first coolant/refrigerant heat exchanger 67. Since the refrigerant will now generally be at a lower temperature than the coolant in the first coolant loop 62, it will absorb heat before leaving the first coolant/refrigerant heat exchanger 67. The first coolant/refrigerant heat exchanger, in effect, acts as an evaporator. The refrigerant then flows through refrigerant line 91, accumulator 80, refrigerant line 84, and back to the compressor 72. The check valve 83 will limit reverse flow of the refrigerant through the evaporator 38.

In this heat pump mode of operation, the coolant flows in the first coolant loop 62 from the engine 64, through the coolant outlet line 63, modulating coolant valve 96, coolant line 47, and into the first coolant three-way valve 65. The three-way valve 65 directs the flow of coolant into heat exchanger intake line 66, but blocks it from flowing into coolant line 55. The coolant then flows through the first coolant/refrigerant heat exchanger 67. As mentioned above, as the coolant flows through this heat exchanger 67 it will give off heat to the refrigerant. The coolant then flows through coolant line 68, the coolant line 69, and back to the engine 64.

In this heat pump mode of operation, coolant also flows in the second coolant loop 61. The water pump 92 is activated and pumps coolant through the second coolant loop 61. Coolant flows through coolant line 71 and into the second coolant/refrigerant heat exchanger 70. As mentioned above, since the refrigerant is at a higher temperature, the coolant will absorb heat from the refrigerant. This coolant, now warmed, then flows through coolant line 57, the pump 92, coolant lines 49 and 43, and into the heater core 44 in the passenger compartment 24. The blower 30 forces air through the heater core 44, warming the air before it flows into the passenger compartment 24. The coolant then flows through coolant line 45, coolant three-way valve 94, and back though coolant line 71. So in this heat pump mode, the heater core 44 gives off the heat absorbed by the coolant from the refrigerant in the second coolant/refrigerant heat exchanger 70.

Since the evaporator 38 is not employed for heating during the heat pump mode of operation, flash fogging issues are eliminated. Moreover, with this system in the heat pump mode at start-up when suction pressure is less than the ambient temperature saturation pressure of the refrigerant, the refrigerant can be automatically pulled from the condenser 76 into the portion of the refrigerant loop 60 used in the heat pump mode by a system pressure difference.

The third mode of operation is a conventional heating mode. This mode occurs when the coolant in the engine is hot and it is desired to add heat to the passenger compartment 24. In this mode, the compressor 72 is not operating, so the refrigerant is not flowing. Also, the water pump 92 is off, so the coolant in the second coolant loop 61 is not flowing. The coolant in the first coolant loop 62 flows the same as in the cooling mode, as discussed above. But the damper 46 is now open, so air flowing through the passage 31 will pass through the heater core 44 and be warmed before it enters the passenger compartment. Again, the amount of opening for the modulating coolant valve 96 and the damper 46 can be controlled to generate the desired amount of heating for the passenger compartment.

Figure 4:
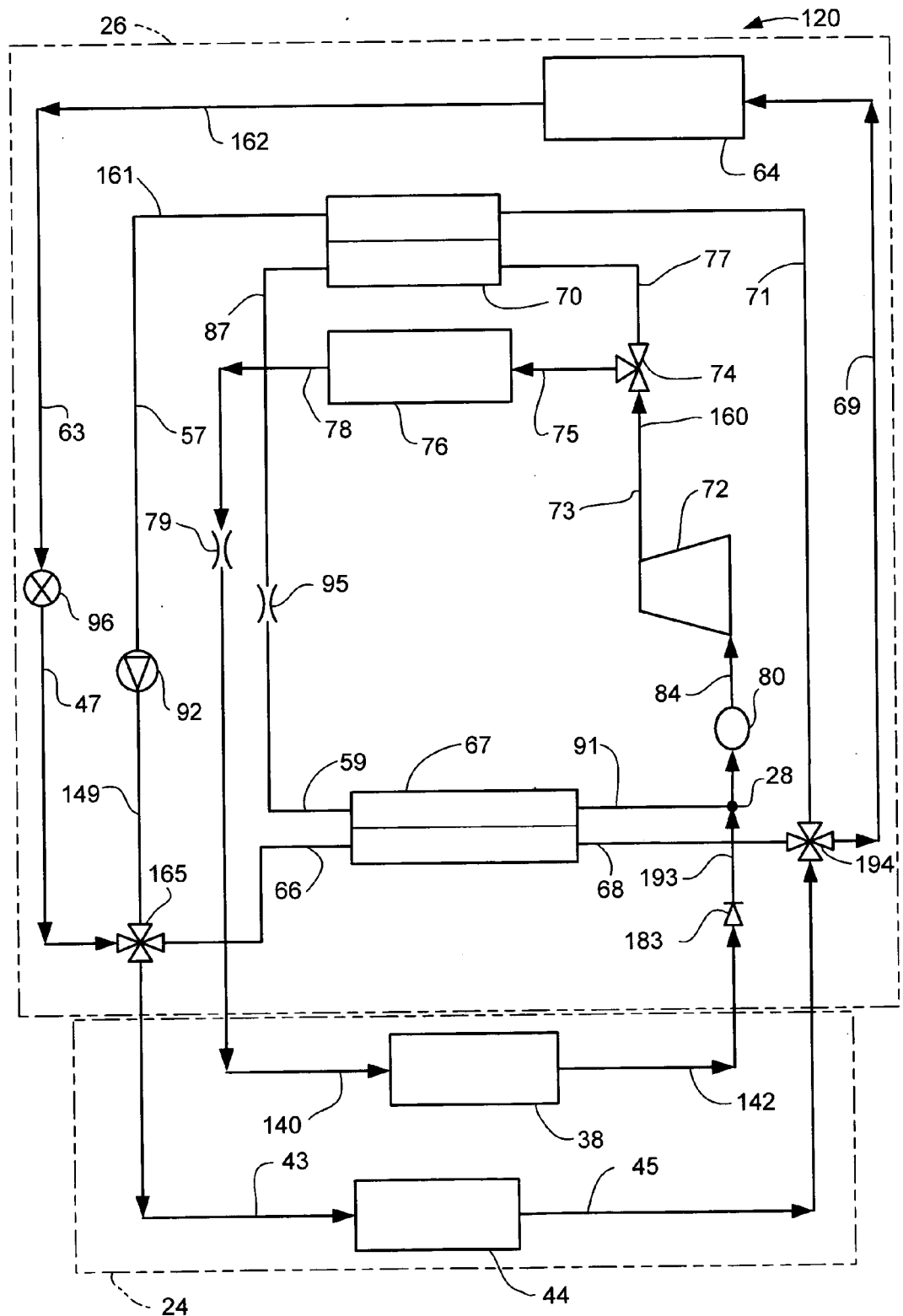
FIG. 4 is a schematic diagram similar to FIG. 2, but illustrating an alternate embodiment of the present invention.
Figure 5:
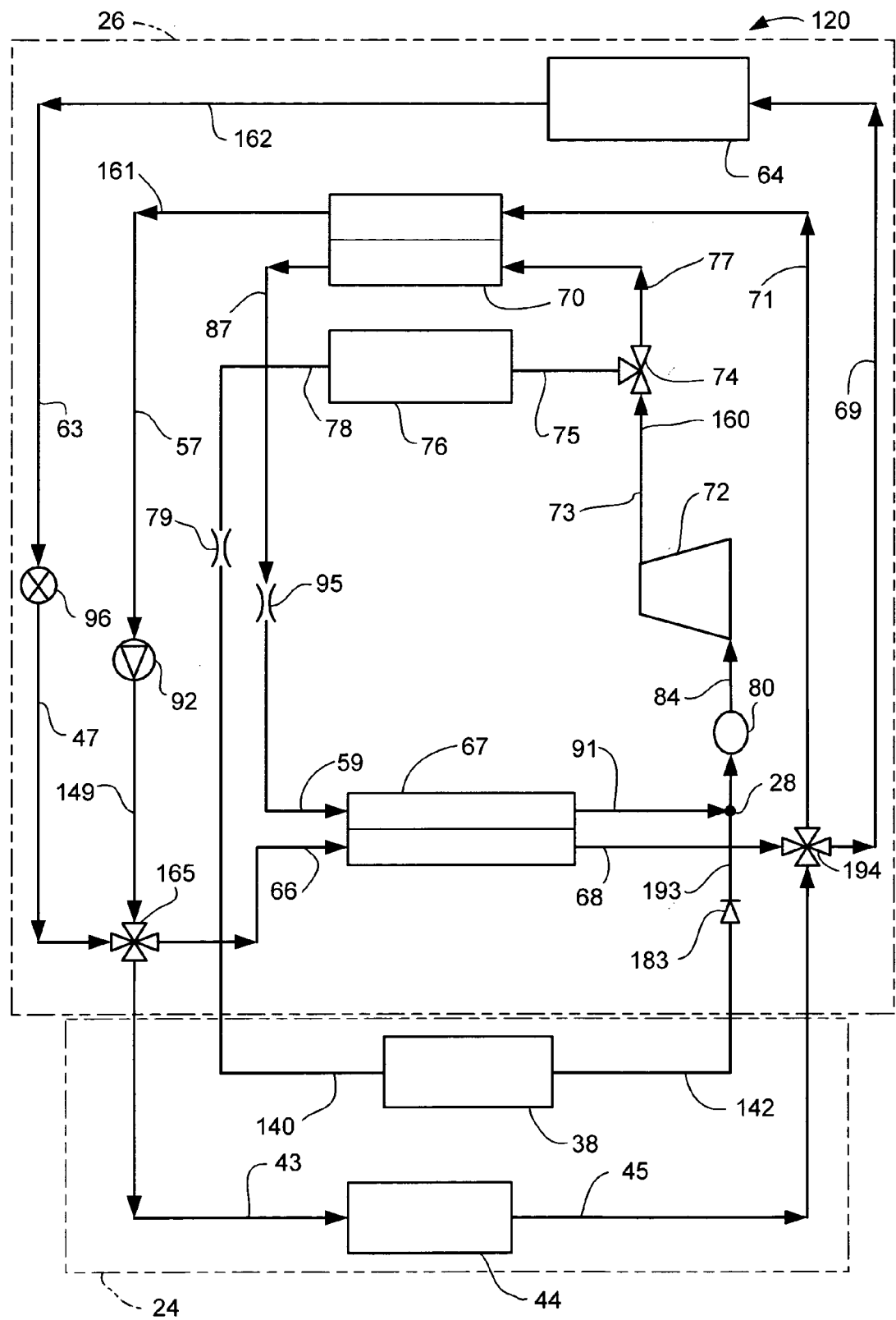
FIG. 5 is a schematic diagram similar to FIG. 3, but illustrating the alternate embodiment of FIG. 4.

FIGS. 4 and 5 illustrate an alternate embodiment of the present invention. Elements in this embodiment that are similar to elements in the first embodiment will be similarly designated, but with a 100-series number, while elements that are the same will be designated with the same number. This embodiment differs from the first in that the coolant three-way valve 65 and tee 25 are replaced with a first coolant four-way valve 165; and the coolant three-way valve 94 and tee 27 are replaced with a second coolant four-way valve 194. Also, the check valve 183 is located downstream of the evaporator 38, although it can remain in the same location of as the first embodiment, if so desired.

The operation of the vehicle heating and cooling system 120 is similar to that of the first embodiment. The flow of the refrigerant and the coolant for the cooling (air conditioning) mode is illustrated by the arrows on the refrigerant and coolant lines in FIG. 4; while the flow of the refrigerant and the coolant for the heat pump mode is illustrated by the arrows on the refrigerant and coolant lines in FIG. 5.

In the air conditioning mode (FIG. 4), the coolant in the first coolant loop 162 flowing through coolant line 47 flows into the first coolant four-way valve 165 and then through coolant line 43 into the heater core 44. From the heater core 44, the coolant flows through coolant line 45, through the coolant four-way valve 194 and back to the engine 64 via coolant line 69. The refrigerant loop 160, and its operation, is generally unchanged from the first embodiment. Also, while the second coolant loop has changed somewhat, there is still not coolant flow through that loop in the air conditioning mode since the water pump 92 is preferably turned off.

In the heat pump mode (FIG. 5), the refrigerant loop 160 and its operation is generally unchanged from the first embodiment. The coolant in the first coolant loop 162 flows from the engine 64, through coolant line 63, modulating coolant valve 96, and coolant line 47 into first coolant four-way valve 165. This valve 165 directs the coolant to coolant line 66, and into the first coolant/refrigerant heat exchanger 67. The coolant then flows through coolant line 68, the second four-way valve 194, coolant line 69, and back to the engine 64. The coolant in the second coolant loop 161 is pumped through pump 92, through coolant line 149, to the first coolant four-way valve 165. The valve 165 directs this coolant to coolant line 43, and into the heater core 44. Coolant flows out of the heater core 44, through coolant line 45, second coolant four-way valve 194, coolant line 71 and into the second coolant/refrigerant heat exchanger 70. In the conventional heating mode, the coolant flows in the first coolant loop 162 the same as described with reference to FIG. 4.

An advantage of the alternate embodiment over the first embodiment is that it eliminates two tees of coolant lines. As a result, it may reduce the volume of coolant in the portion of the coolant loop employed for the heat pump operation, thus reducing the thermal inertia, which improves the warm-up performance.

Figure 6:
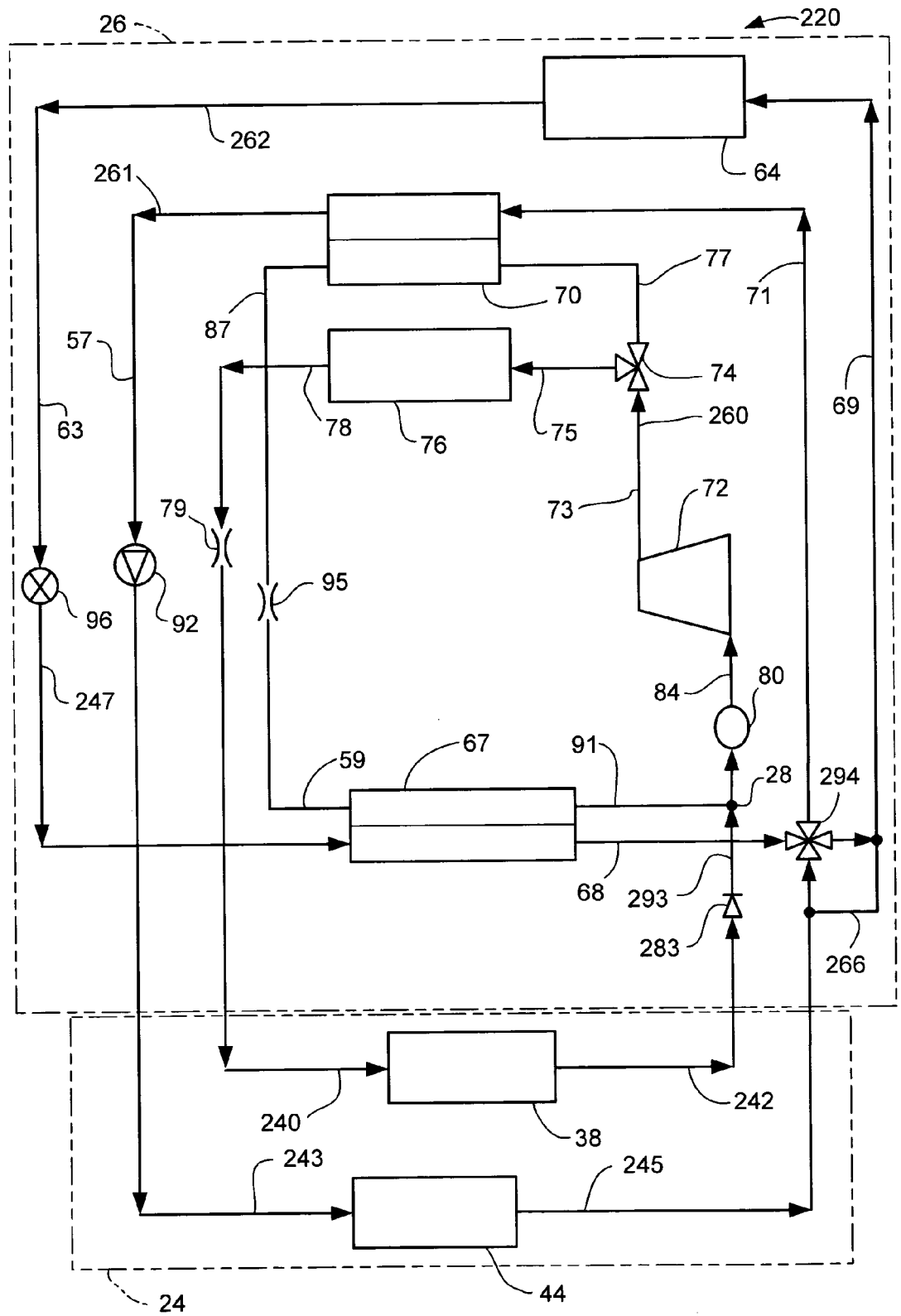
FIG. 6 is a schematic diagram similar to FIG. 2, but illustrating a third embodiment of the present invention.
Figure 7:
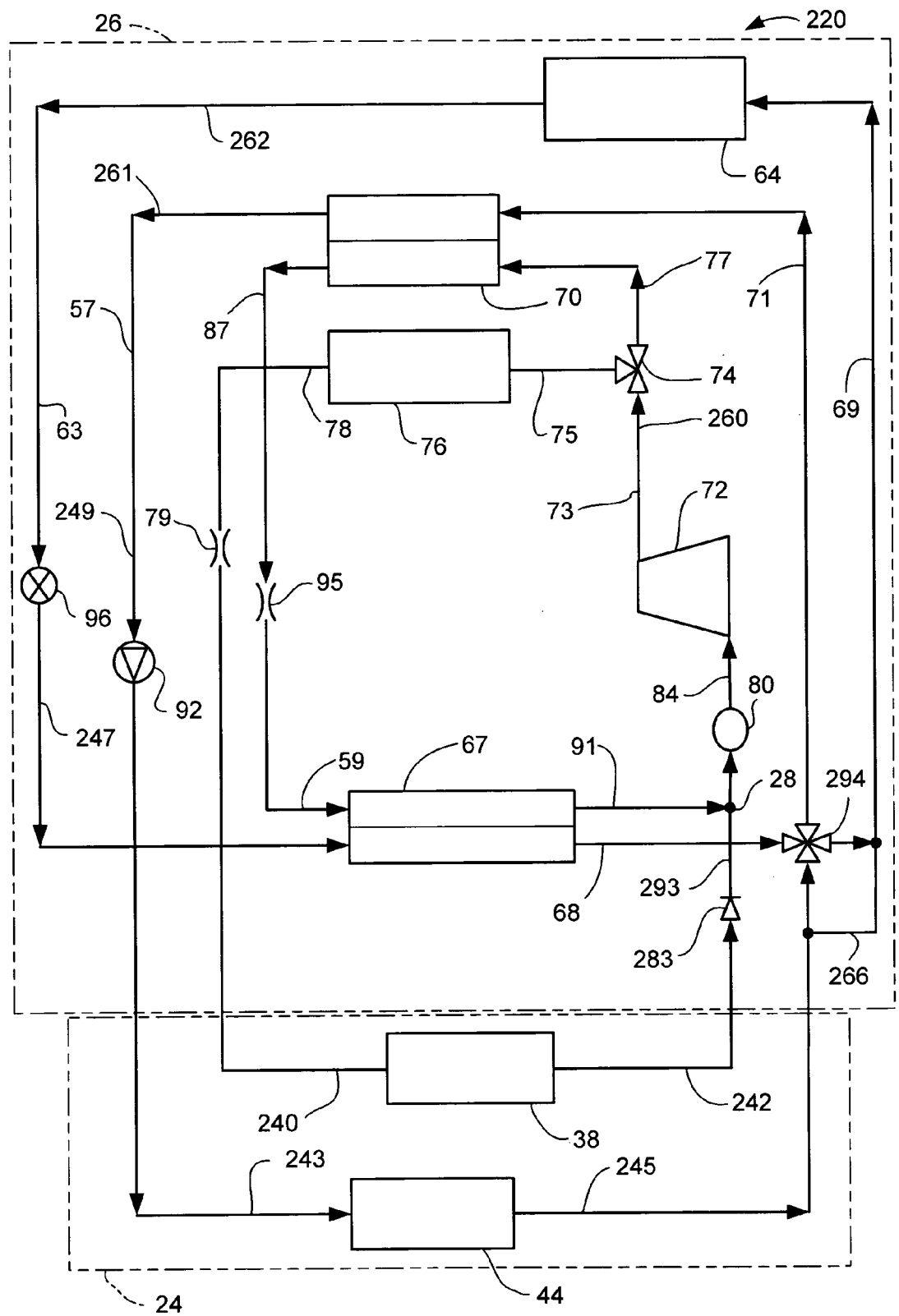
FIG. 7 is a schematic diagram similar to FIG. 3, but illustrating the third embodiment of the present invention.

FIGS. 6 and 7 illustrate a third embodiment of the present invention. Elements in this embodiment that are similar to elements in the first embodiment will be similarly designated, but with a 200-series number, while elements that are the same will be designated with the same number.

This embodiment differs from the first in that the coolant three-way valve 65 and tee 25 are eliminated, and the coolant three-way valve 94 and tee 27 are replaced with a coolant four-way valve 294.

Also, in this embodiment, while the check valve 283 is relocated to between the refrigerant lines 242 and 293 on the output side of the evaporator 38, rather than in the refrigerant lines leading to the input to the evaporator, it can be located the same as in the first embodiment. Locating the check valve 283 downstream of the evaporator 38, however, may provide an advantage for charge management, especially when operating in the heat pump mode in cold ambient air conditions, as discussed above.

Additionally, in this embodiment, an optional coolant bypass line 266 can be connected between the coolant outlet line 245 from the heater core 44 and the coolant line 69 leading back to the engine 64. This optional coolant line can also be employed with the systems of the first and second embodiments as well. This optional coolant bypass line 266 may better allow for coolant expansion in the second coolant loop 261 as the coolant is heated.

The operation of the vehicle heating and cooling system 220 is similar to that of the first embodiment. The flow of the refrigerant and the coolant for the cooling (air conditioning) mode is illustrated by the arrows on the refrigerant and coolant lines in FIG. 6; while the flow of the refrigerant and the coolant for the heat pump mode is illustrated by the arrows on the refrigerant and coolant lines in FIG. 7.

In the air conditioning mode (FIG. 6), the refrigerant loop 260, and its operation, is generally unchanged from the first embodiment. If the air conditioning mode is running at or near maximum air conditioning, then the water pump 92 is preferably off and the coolant valve 96 is preferably closed, so there is no coolant flow through either coolant loop 261, 262. Alternatively, if one desires a blending of some heat with the cooling effect of the evaporator 38, one may partially or fully open the damper 46 (see FIG. 1) and control the flow rate of the coolant with the water pump 92 and coolant valve 96.

In this embodiment, when the coolant is flowing in the air conditioning mode, the four-way valve 294 is set so that the coolant flows through both coolant loops 261, 262 as if they were a single loop. The coolant flows from the engine 64, through coolant line 63, the coolant valve 96, coolant line 247, and into the first coolant/refrigerant heat exchanger 67. Since no refrigerant is flowing through this heat exchanger in the air conditioning mode, essentially no heat transfer takes place. The coolant then flows through coolant line 68, the four-way valve 294, coolant line 71 and into the second coolant/refrigerant heat exchanger 70. Again, since no refrigerant is flowing through this heat exchanger in the air conditioning mode, essentially no heat transfer takes place. The coolant then flows through coolant line 57, is pumped through water pump 92, through coolant line 243 and into the heater core 44. The air flowing through the heater core 44 is blended with the air flowing through the evaporator 38 for controlling the amount of cooling to the passenger compartment 24. The coolant then flows through coolant line 245, four-way valve 294, coolant line 69 and back to the engine 64. Some coolant may also flow through coolant bypass line 266.

In the heat pump mode (FIG. 7), the refrigerant loop 260 and its operation is generally unchanged from the first embodiment. The flow of the coolant in the two coolant loops 261, 262 is very similar to the flow in the first embodiment. In this embodiment, operating in the heat pump mode, the coolant flows in the first coolant loop 262 from the engine 64, through the coolant outlet line 63, modulating coolant valve 96, coolant line 247, and into the first coolant/refrigerant heat exchanger 67. As mentioned above, as the coolant flows through this heat exchanger 67 it will give off heat to the refrigerant. The coolant then flows through coolant line 68, the four-way valve 294, the coolant line 69, and back to the engine 64. Coolant also flows in the second coolant loop 261. The water pump 92 is activated and pumps coolant through this second coolant loop 261. Coolant flows through coolant line 71 and into the second coolant/refrigerant heat exchanger 70. As mentioned above, since the refrigerant is at a higher temperature, the coolant will absorb heat from the refrigerant. This coolant, now warmed, then flows through coolant line 57, the pump 92, coolant line 243, and into the heater core 44 in the passenger compartment 24. The blower 30 (FIG. 1) forces air through the heater core 44, warming the air before it flows into the passenger compartment 24. The coolant then flows through coolant line 245, coolant four-way valve 294, and back though coolant line 71. Coolant will also flow through the coolant bypass line 266 in order to better allow for coolant expansion in the second coolant loop 261 as the coolant is heated, as mentioned above.

In the conventional heating mode of operation, the compressor 72 is turned off, so no refrigerant flows through the refrigerant loop 260. The four-way valve 294 is switched the same as with the air conditioning mode of operation, so the coolant flows the same as in that mode of operation. But, since the coolant is warm due to the engine operation, the coolant flowing through the heater core 44 will give off heat as air flows through it, thus warming the passenger compartment 24.

While certain embodiments of the present invention have been described in detail, those familiar with the art to which this invention relates will recognize various alternative designs and embodiments for practicing the invention as defined by the following claims.

What is claimed is:

1. A heating and cooling system for a vehicle having an engine and a passenger compartment, the heating and cooling system comprising:
    at least one coolant loop having a coolant outlet line and a coolant inlet line adapted to operatively engage the engine, a heater core, a first coolant/refrigerant heat exchanger, a second coolant/refrigerant heat exchanger, and at least one coolant valve for selectively directing flow of a coolant from the coolant outlet line to the coolant inlet line through at least one of the heater core, the first coolant/refrigerant heat exchanger, and the second coolant/refrigerant heat exchanger;
    a pump operatively engaging the at least one coolant loop; and
    a refrigerant loop having a compressor with an inlet and an outlet, a first refrigerant valve for selectively directing the flow of a refrigerant from the compressor outlet to one of a condenser and the second coolant/refrigerant heat exchanger, a first refrigerant passage connected to the condenser for directing the flow of the refrigerant from the condenser, through a first expansion device and to an evaporator, and a second refrigerant line connected to the second coolant/refrigerant heat exchanger for directing the flow of the refrigerant from the second coolant/refrigerant heat exchanger, through a second expansion device and to the first coolant/refrigerant heat exchanger.

2. The heating and cooling system of claim 1 wherein the refrigerant loop includes a one-way valve located in the refrigerant loop to allow refrigerant to flow through the evaporator in only one direction.

3. The heating and cooling system of claim 1 wherein the refrigerant loop includes an accumulator operatively engaging the compressor inlet.

4. The heating and cooling system of claim 1 wherein the first refrigerant valve is a three-way valve.

5. The heating and cooling system of claim 1 wherein the first expansion device is an orifice tube.

6. The heating and cooling system of claim 1 wherein the at least one coolant valve is a four-way valve.

7. The heating and cooling system of claim 1 wherein the at least one coolant valve comprises a first four-way coolant valve and a second four-way coolant valve.

8. The heating and cooling system of claim 1 wherein the heater core and the evaporator are adapted to be located in the passenger compartment.

9. The heating and cooling system of claim 1 wherein the second expansion device is an orifice tube.

10. The heating and cooling system of claim 1 wherein the at least one coolant valve comprises a first three-way coolant valve and the heating and cooling system further includes a second three-way coolant valve.

11. The heating and cooling system of claim 1 wherein the at least one coolant loop further includes a modulating coolant valve operatively engaging the coolant outlet line for selectively restricting the amount of coolant flow in the at least one coolant loop.

12. The heating and cooling system of claim 1 wherein the pump is electronically controllable.

13. The heating and cooling system of claim 1 wherein the first expansion device is a first orifice tube, and the second expansion device is a second orifice tube; and the refrigerant loop further includes an accumulator operatively engaging the compressor inlet.

14. A heating and cooling system for a vehicle having an engine and a passenger compartment, the heating and cooling system comprising:
    a first coolant loop having a coolant outlet line and a coolant inlet line adapted to couple to the engine, a heater core, a first coolant/refrigerant heat exchanger, and a first coolant valve and a second coolant valve for selectively directing flow of a coolant from the coolant outlet line to the coolant inlet line through one of the heater core and the first coolant/refrigerant heat exchanger;

a second coolant loop having a second coolant/refrigerant heat exchanger with a coolant inlet line and a coolant outlet line which are selectively connected for coolant flow through the heater core by the first coolant valve and the second coolant valve;

a pump operatively engaging at least one of the first coolant loop and the second coolant loop; and a refrigerant loop having a compressor with an inlet and an outlet, a first refrigerant valve for selectively directing the flow of a refrigerant from the compressor outlet to one of a condenser and the second coolant/refrigerant heat exchanger, a first refrigerant passage connected to the condenser for directing the flow of the refrigerant from the condenser, through a first expansion device and to an evaporator, and a second refrigerant line connected to the second coolant/refrigerant heat exchanger for directing the flow of the refrigerant from the second coolant/refrigerant heat exchanger, through a second expansion device and to the first coolant/refrigerant heat exchanger.

15. The heating and cooling system of claim 14 wherein the first expansion device is a first orifice tube, and the second expansion device is a second orifice tube; and the refrigerant loop further includes an accumulator operatively engaging the compressor inlet.

16. The heating and cooling system of claim 14 wherein the evaporator includes an outlet, and the refrigerant loop includes a one-way valve operatively engaging the evaporator outlet to allow refrigerant to flow through the evaporator in only one direction.

17. The heating and cooling system of claim 14 wherein the first coolant loop further includes a modulating coolant valve for selectively restricting the amount of coolant flow in the first coolant loop.

18. A method of providing heating and cooling to a passenger compartment of a vehicle having an engine, the method comprising the steps of:

selectively circulating a coolant from the engine, through at least one of a heater core and a first coolant/refrigerant heat exchanger, and back to the engine;

selectively circulating the coolant from a pump, through one of a second coolant/refrigerant heat exchanger and the heater core, through the other of the second coolant/refrigerant heat exchanger and the heater core, and back to the pump; and selectively circulating a refrigerant from a compressor and back to the compressor through one of a first refrigerant path, having a condenser and an evaporator, and a first expansion device between the condenser and the evaporator, and a second refrigerant path, having the second coolant/refrigerant heat exchanger, the first coolant/refrigerant heat exchanger, and a second expansion device between the second coolant/refrigerant heat exchanger and the first coolant/refrigerant heat exchanger.

19. The method of claim 18 further including the step of circulating the refrigerant through an accumulator just prior to circulating the refrigerant through the compressor.

20. The method of claim 18 further including the step of preventing the circulation of refrigerant through the evaporator in more than one direction.

21. The method of claim 18 further including the step of selectively modulating the circulation of coolant from the engine.

22. The method of claim 18 wherein the step of selectively circulating the coolant from the engine includes, selectively circulating the coolant through the first coolant/refrigerant heat exchanger, the second coolant/refrigerant heat exchanger, the heater core, and back to the engine.

23. The method of claim 18 wherein the step of selectively circulating the coolant from the engine includes selectively circulating the coolant from the engine through one of the heater core or the first coolant/refrigerant heat exchanger and back to the engine.

24. The method of claim 18 wherein the step of selectively circulating refrigerant is further defined by, the first expansion device through which refrigerant is circulating being an orifice tube.

25. The method of claim 18 wherein the step of selectively circulating refrigerant is further defined by, the second expansion device through which refrigerant is circulating being an orifice tube.

* * * * *